United States Patent
Nelson

(10) Patent No.: US 6,553,422 B1
(45) Date of Patent: Apr. 22, 2003

(54) REVERSE HTTP CONNECTIONS FOR DEVICE MANAGEMENT OUTSIDE A FIREWALL

(75) Inventor: Dean S. Nelson, Meridian, ID (US)

(73) Assignee: Hewlett-Packard Development Co., L.P., Houston, TX (US)

( * ) Notice: Subject to any disclaimer, the term of this patent is extended or adjusted under 35 U.S.C. 154(b) by 0 days.

(21) Appl. No.: 09/299,832

(22) Filed: Apr. 26, 1999

(51) Int. Cl.[7] .............................................. G06F 15/16
(52) U.S. Cl. ....................... 709/227; 709/225; 709/229; 709/217; 713/201
(58) Field of Search .................................. 709/225, 210, 709/217, 229, 227, 218, 219; 713/201, 227; 714/48

(56) References Cited

U.S. PATENT DOCUMENTS

| | | | |
|---|---|---|---|
| 5,720,035 A | * 2/1998 | Allegre et al. | 709/225 |
| 5,778,174 A | * 7/1998 | Cain | 713/201 |
| 5,805,803 A | * 9/1998 | Birrell et al. | 713/201 |
| 5,826,029 A | * 10/1998 | Gore, Jr. et al. | 709/227 |
| 5,909,493 A | * 6/1999 | Motoyama | 380/25 |
| 5,944,823 A | * 8/1999 | Jade et al. | 713/201 |
| 5,960,177 A | * 9/1999 | Tanno | 709/229 |
| 5,964,891 A | * 10/1999 | Caswell et al. | 714/31 |
| 5,974,463 A | * 10/1999 | Warrier et al. | 709/225 |
| 6,061,797 A | * 5/2000 | Jade et al. | 713/201 |
| 6,104,716 A | * 8/2000 | Crichton et al. | 370/401 |
| 6,154,843 A | * 11/2000 | Hart, Jr. et al. | 713/201 |
| 6,202,081 B1 | * 3/2001 | Naudus | 709/200 |
| 6,233,688 B1 | * 5/2001 | Montenegro | 713/201 |
| 6,345,300 B1 | * 2/2002 | Bakshi et al. | 709/203 |
| 6,349,336 B1 | * 2/2002 | Sit et al. | 709/227 |
| 6,374,298 B2 | * 4/2002 | Tanno | 709/227 |

* cited by examiner

*Primary Examiner*—Ario Etienne
*Assistant Examiner*—Abdullahi E. Salad

(57) ABSTRACT

A method for enabling a remote processor to control a device coupled to a local processor, where the local processor is coupled to a computer network and a firewall is operatively interposed between the local processor and the computer network. The firewall routes messages from the local processor to the computer network, and only when authorized, routes messages from the computer network to the local processor. The local processor initiates communication with the remote processor, authorizes the firewall to pass a message from the remote processor to the local processor, and executes commands to manage the device as indicated in the message from the remote processor. The exchange of messages is continued when the message from the remote processor directs the local processor to send a next message to the remote processor. A reverse HTTP connection is established when the messages received from the remote processor are requests, and the messages sent to the remote processor are responses.

20 Claims, 4 Drawing Sheets

REVERSE HTTP CONNECTIONS FOR DEVICE MANAGEMENT OUTSIDE A FIREWALL

FIELD OF THE INVENTION

The present invention relates to control of a local device from a remote processor and, more particularly, to a method of controlling a device connected to a local processor, which is coupled to a remote processor across a computer network, where a firewall is operatively interposed between the local processor and the computer network.

BACKGROUND OF THE INVENTION

Computer data processing systems often include a group of peripheral devices, such as printers, connected to a processor or server, in a local area network (LAN). Software running on the processor allows an operator to configure operating parameters and monitor the performance of all of the locally connected peripherals.

In general, as features and conveniences offered by a computer system are enhanced, the software controlling the system becomes increasingly sophisticated and complex. Installation and troubleshooting of the system often requires specialized knowledge of the system and the peripherals. When confronted with a problem, the operator of the system often must obtain assistance from technical support personnel having this specialized knowledge.

An operator initially seeking assistance typically places a telephone call to a service center and speaks with a technical support representative. The representative first obtains information from the operator regarding the configuration of the particular system at issue, and thereafter guides the operator through an installation or troubleshooting procedure.

Technical support by telephone is almost always time consuming and expensive. It requires the resources of the operator and technical representative, and often involves a long distance telephone call. To be successful, both the operator and the representative must be capable of engaging in a prolonged dialogue and exchanging technical information and directions. This arrangement is susceptible to errors brought on by poor communication or inadequate training of the operator or representative. Even under the best of circumstances, there is no guarantee of success. An unsuccessful session of technical support by telephone can leave the operator with feelings ranging from annoyance to complete frustration, and tarnish the image of the vendor providing the support.

Technical service is improved when the representative has first hand access to the system at issue. This can be achieved by traveling to the site where the system is installed, but necessarily incurs the expense of traveling to and from the site. A preferable alternative is for the representative to have remote access to the system.

The Internet offers a channel by which remotely located computers may exchange information with one another. A first computer may send a request for information, across the Internet, to a second computer. The second computer then responds with a message that includes the desired information.

For purposes of security and system integrity, many organizations install firewalls that restrict the exchange of information with computers outside of the organization. A firewall is interposed between a local computer system and the Internet to block undesired incoming requests and information. Consequently, a local computer system that is protected by a firewall cannot be unconditionally accessed from a remote location.

Referring to FIG. 1, a local computer 50 and a remote computer 70 are coupled across the Internet 65. A proxy machine 60 is operatively interposed between local computer 50 and the Internet 65.

Proxy machine 60 interfaces with the Internet 65 on behalf of local computer 50, and routes messages from the Internet 65 to local computer 50 only when authorized to do so. By way of example, local computer 50 initiates communication with remote computer 70 by sending a request 75, via proxy machine 60, to remote computer 70. Request 75 includes proxy information in a hypertext transfer protocol (HTTP) header that authorizes proxy machine 60 to route a message from remote computer 70 to local computer 50. Subsequently, remote computer 70 sends a response 80, which proxy machine 60 routes to local computer 50.

Proxy machine 60 serves as a firewall to protect the integrity of local computer 50 by preventing unauthorized messages from being routed to local computer 50 from the Internet 65. Not only does proxy machine 60 block unauthorized incoming data, but it also blocks unauthorized incoming requests that would otherwise interrogate local computer 50. Consequently, remote computer 70 cannot unconditionally write data to, or read data from local computer 50.

Since local computer 50 must authorize proxy machine 60 to accept incoming messages on a per message basis, each message from remote computer 70 to local computer 50 must be initiated by local computer 50. In a situation where several messages are exchanged, a pattern of requests and responses is necessary. Local computer 50 sends a request 75, receives a response 76, sends a request 77, receives a response 78, sends a request 79, receives a response 80, etc. In the general case, local computer 50 sends requests to, and receives responses from, remote computer 70.

There is a need for a technical support representative to manage a computer system from which the representative is remotely located. Through remote access, the representative can configure, monitor and troubleshoot the system with little or no intervention on the part of an operator at the system site. Additionally, there is a need for the representative to access a computer system that is protected by a firewall restricting the representative's access to the computer system.

Accordingly, it is an object of the present invention to provide a method for a remote computer system to access a local computer system across the Internet, where a firewall is operatively interposed between the Internet and the local computer system.

It is another object of the present invention to provide such a method that enables a user of the remote computer system to configure peripheral devices coupled to the local computer system.

It is another object of the present invention to provide such a method that can be initiated by a command from a user of the local computer system, by a command included in an electronic mail message received from the remote computer system, or by a command generated from within a peripheral device.

It is yet another object of the present invention to provide such a system where a first message from the local computer system to the remote computer system is a request, and thereafter, messages from the remote system to the local system are requests, and messages from the local system to the remote system are responses, thus establishing a reverse HTTP connection across a firewall.

SUMMARY OF THE INVENTION

A local computer system includes a processor for controlling a group of peripheral devices in a local area network (LAN). A technical representative at a remote computer system desires access and control of the local system.

The local system is coupled to the Internet through a proxy machine that restricts the free flow of information between the Internet and the local system. The proxy machine allows a message to be routed from the Internet to the local system only when authorized to do so by a response request from the local system. When the local system desires information from a remote system, the local system issues a response request, via the proxy machine, to the remote system. Consequently, the remote system cannot unconditionally access or control the local system.

The local system initiates communication with the remote system and authorizes the proxy machine to route a message from the remote system to the local system. The message from the remote system indicates commands for controlling peripheral devices connected to the local system. The local system executes the commands as indicated. The remote processor thereby indirectly controls the peripheral devices.

The message from the remote system may include a command for the local system to send information to the remote system. If so, the local system responds by sending the information, and again, authorizing the proxy machine to route a message from the remote system to the local system. The remote system retains control of the local peripheral devices by including, in each message to the local system, a command for the local system to send information to the remote system.

DETAILED DESCRIPTION OF THE INVENTION

In conventional Internet parlance, and according to hypertext transfer protocol (HTTP), a "request" is a message issued by a first processor seeking information from a second processor, and a "response" is a message from the second processor, to the first processor, that includes the requested information. Ordinarily, a processor protected behind a firewall issues requests, and receives responses. In the present invention, the local processor makes a first request to the remote processor, but thereafter, the messages from the remote processor are "requests", and the messages to the remote processor are "responses." Thus is established a reverse HTTP connection for device management outside a firewall.

Figure 2:
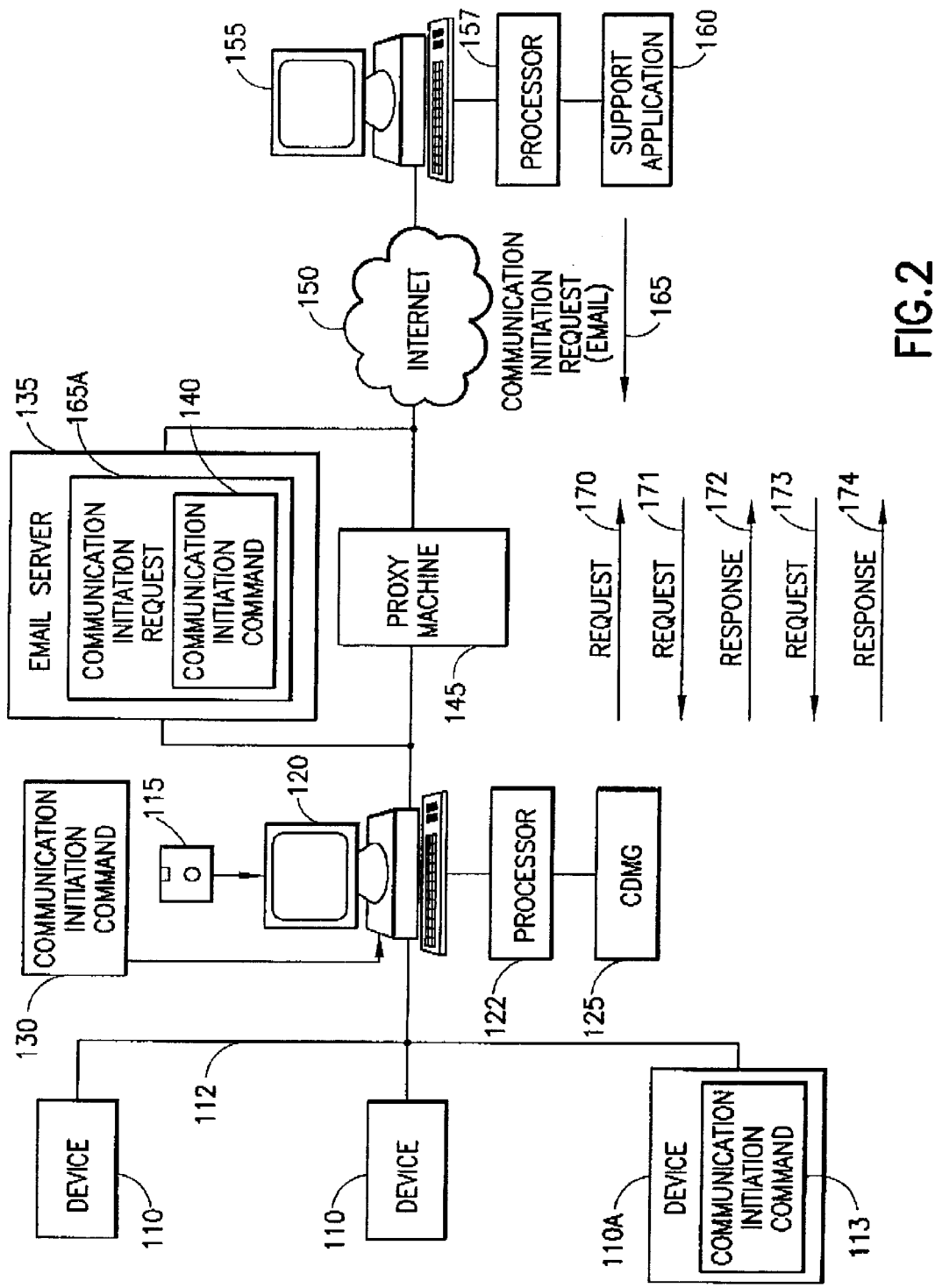
FIG. 2 is a block diagram of a computer system particularly adapted to carry out the present invention.

FIG. 2 is a block diagram of a computer system particularly adapted to carry out the present invention. A group of peripheral devices 110 are coupled to a local processor 122 in a LAN 112. Local computer 120 is coupled to the Internet 150 through a proxy machine 145. A remote computer 155 is also coupled to the Internet 150.

Local computer 120 includes a local processor 122, computer memory (not shown), and a client device management gateway (CDMG) 125. CDMG 125 controls local processor 122 to perform the method of the present invention. Remote computer 155 includes a remote processor 157, and a support application 160 that communicates with CDMG 125 to control devices 110.

CDMG 125 controls local processor 122 to initiate communication with remote processor 157 by sending a request 170, via proxy machine 145, to remote processor 157. Request 170 would typically include information identifying local processor 122 and devices 110. Request 170 also includes proxy information in an HTTP header that authorizes proxy machine 145 to route a message from remote processor 157 to local processor 122. Subsequently, remote processor 157 responds by sending a request 171, which proxy machine 145 routes to local processor 122. Note that request 171 is effectively a response to request 170.

Request 171 is a message indicating one or more commands that are to be executed by local processor 122 with respect to devices 110. For example, the commands may indicate that devices 110 are to be reinitialized. Request 171 can also direct local processor 122 to send information to remote processor 157. For example, support application 160 may require additional information regarding the local processor 122 or the configuration of devices 110. Local processor 122 sends the requested information in response 172.

Response 172 includes proxy information in an HTTP header that authorizes proxy machine 145 to route another "response" message from remote processor 157 to local processor 122. Remote processor 157 thereafter sends a request 173, which proxy machine 145 routes to local processor 122. Request 173 can indicate commands to be executed with respect to devices 110, and can also direct local processor 122 to provide more information to remote processor 157. If request 173 includes a direction for local processor 122 to send additional information, then local computer sends the additional information in response 174.

Figure 1:
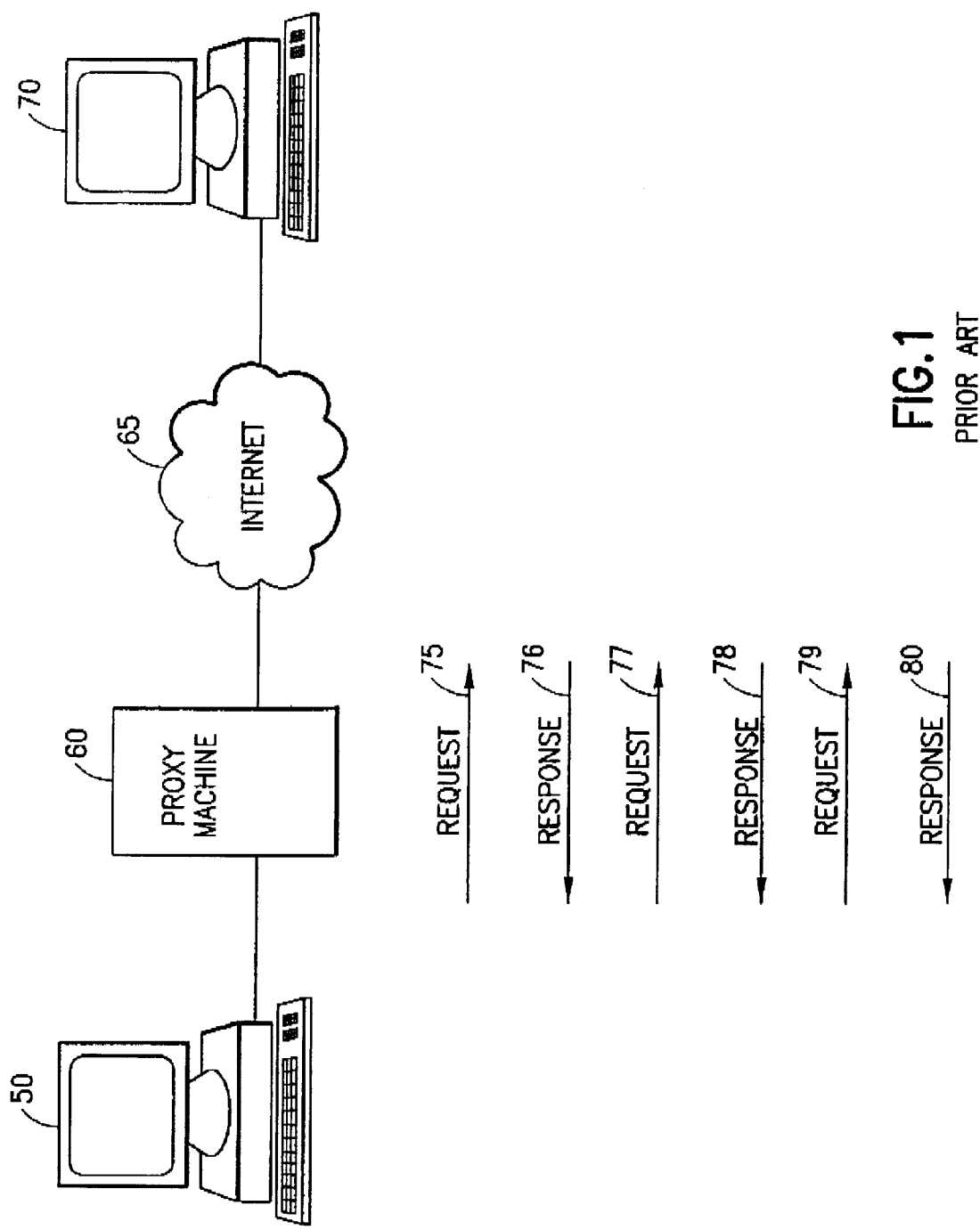
FIG. 1 is a block diagram of a computer system including a local computer coupled to the Internet through a proxy machine according to the prior art.

Note that after request 170 is sent, a pattern of requests and responses becomes apparent. In the general case remote processor 157 sends requests to, and receives responses from, local processor 122. This pattern is opposite of the pattern shown in FIG. 1. Each message (request 170 and responses 172, 174) sent by local processor 122 to remote processor 157, includes proxy information in an HTTP header that authorizes proxy machine 145 to route a message (requests 171, 173) from remote processor 157 to local processor 122. Devices 110 are thereby indirectly controlled from remote processor 157.

CDMG 125 will initiate communication with remote processor 157 in response to a communication initiation command 130 applied through any standard user interface such as a keyboard. This would be the case, for example, when an operator of local processor 122 needs assistance installing or troubleshooting devices 110.

CDMG 125 will also initiate communication in response to a communication initiation command 140 received via electronic mail (email). Using Simple Mail Transfer Protocol (SMTP), remote processor 157 can send a communication initiation request 165, which is stored on email server 135 as communication initiation request 165a. Communication initiation request 165 (and 165a) contains communication initiation command 140. Communication initiation command 140 is executed when communication initiation request 165*a* is read from email server 135 by CDMG 125, which periodically polls email server 135. Communication initiation request 165 could be used, for example, in a case where the performance of devices 110 is periodically evaluated and calibrated by support application 160. It also allows an opportunity for a third party (not shown) to automatically monitor and calibrate devices 110.

A third method for prompting CDMG 125 to initiate communication can be generated by communication initiation command 113 from within a device 110*a*. Communication initiation command 113 is used in a case where device 110*a* automatically runs through a self-test and detects an anomaly, or runs a periodic maintenance program. Device 110*a* issues communication initiation command 113 to CDMG 125, which then initiates communication with remote processor 157 to begin an automatic test and calibration of device 110*a*.

Figure 3:
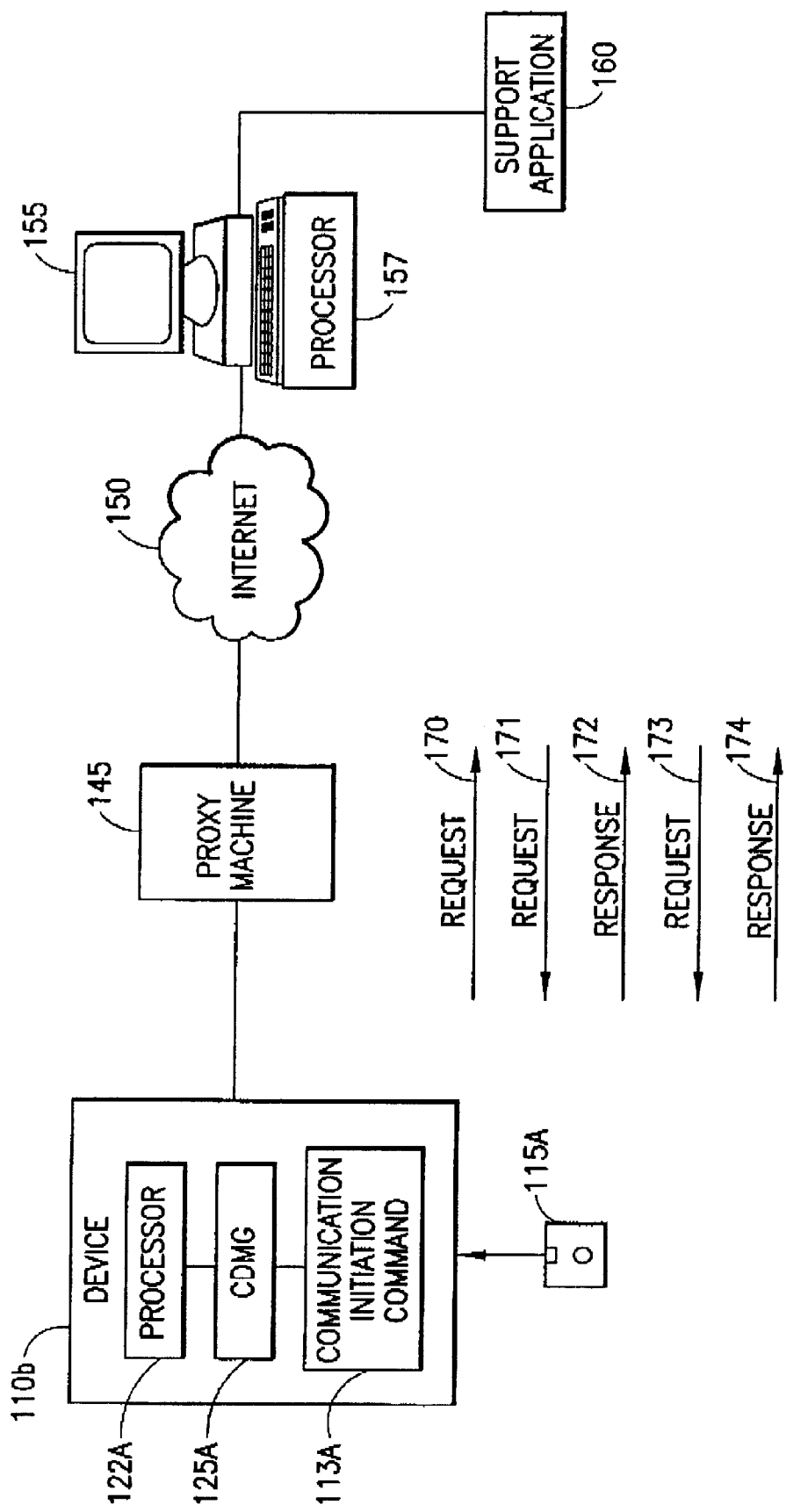
FIG. 3 is a block diagram of an alternative embodiment of a computer system for carrying out the present invention.

FIG. 3 is a block diagram of an alternative embodiment of a computer system for carrying out the present invention. A device 110*b* is coupled to the Internet 150 through a proxy machine 145. A remote computer 155 is also coupled to the Internet 150.

Device 110*b* includes a local processor 122*a*, computer memory (not shown), and a client device management gateway (CDMG) 125*a*. CDMG 125*a* controls local processor 122*a* to perform the method of the present invention. Remote computer 155 includes a remote processor 157, and a support application 160 that communicates with CDMG 125*a* to control device 110*b*.

Communication initiation command 113*a* is generated when device 110*b* automatically runs through a self-test and detects an anomaly, or runs a periodic maintenance program. Communication initiation command 113 prompts CDMG 125*a* to initiate communication with remote processor 157.

CDMG 125*a* controls local processor 122*a* to initiate communication with remote processor 157 by sending a request 170, via proxy machine 145, to remote processor 157. Request 170 would typically include information identifying local processor 122*a* and device 110*b*. Request 170 also includes proxy information in an HTTP header that authorizes proxy machine 145 to route a message from remote processor 157 to local processor 122*a*. Subsequently, remote processor 157 responds by sending a request 171, which proxy machine 145 routes to local processor 122*a*. Note that request 171 is effectively a response to request 170.

Request 171 is a message indicating one or more commands that are to be executed by local processor 122*a* with respect to device 110*b*. For example, the commands may indicate that device 110*b* is to be reinitialized. Request 171 can also direct local processor 122*a* to send information to remote processor 157. For example, support application 160 may require additional information regarding the local processor 122*a* or the configuration of device 110*b*. Local processor 122*a* sends the requested information in response 172.

Response 172 includes proxy information in an HTTP header that authorizes proxy machine 145 to route another "response" message from remote processor 157 to local processor 122*a*. Remote processor 157 thereafter sends a request 173, which proxy machine 145 routes to local processor 122*a*. Request 173 can indicate commands to be executed with respect to device 110*b*, and can also direct local processor 122*a* to provide more information to remote processor 157. If request 173 includes a direction for local processor 122 to send additional information, then local computer sends the additional information in response 174.

This pattern of requests and responses is like that discussed above in the context of FIG. 2. Each message (request 170 and responses 172, 174) sent by local processor 122*a* to remote processor 157, includes proxy information in an HTTP header that authorizes proxy machine 145 to route a message (requests 171, 173) from remote processor 157 to local processor 122*a*. Device 110*b* is thereby indirectly controlled from remote processor 157.

Figure 4:
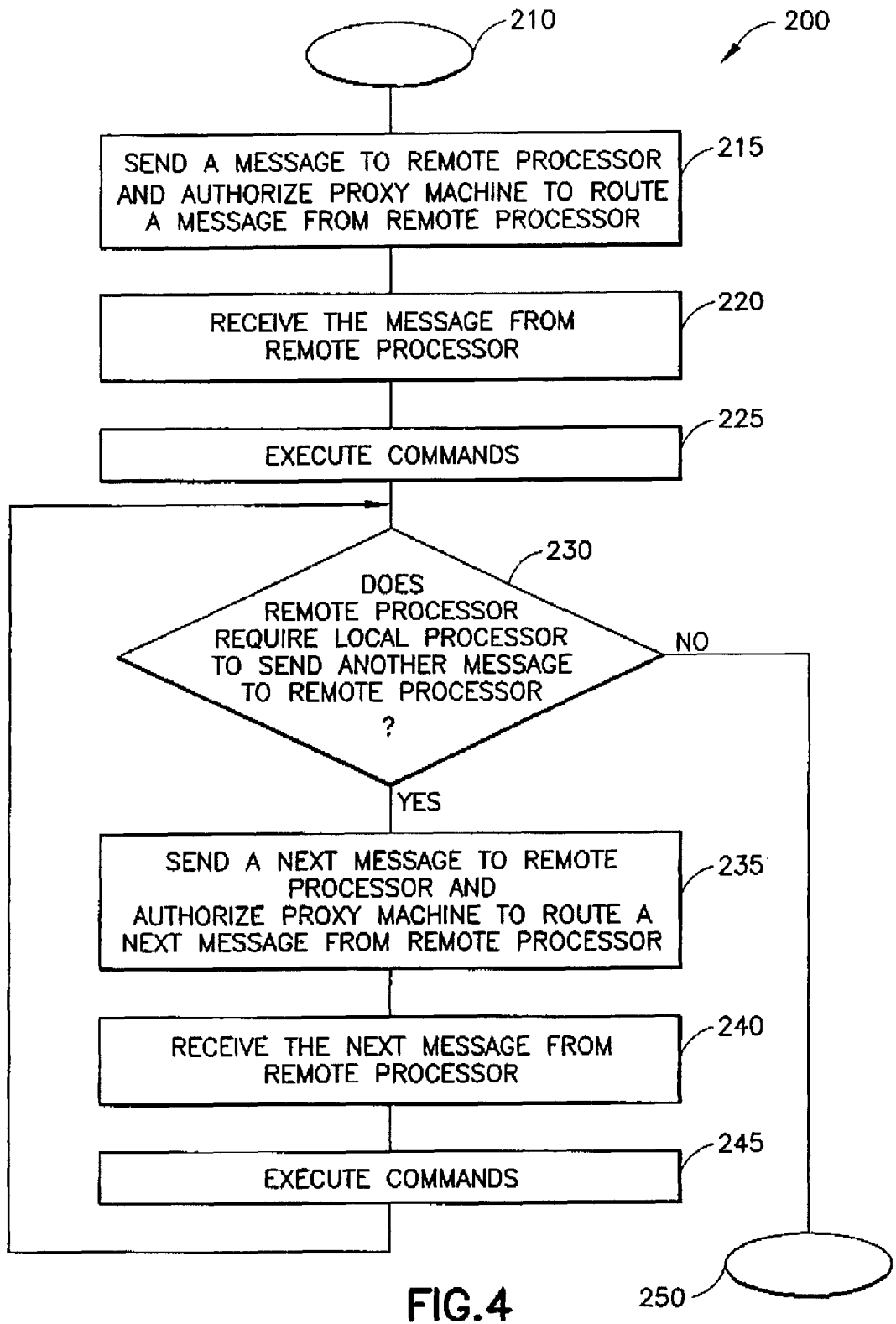
FIG. 4 is a flowchart illustrating the method of the present invention.

FIG. 4 illustrates the logical steps of a device management process, generally indicated by reference number 200, according to the present invention. As mentioned above, device management process 200 can be started by a user-initiated communication initiation command 130, an email communication initiation command 140, or a device-initiated communication initiation command 113. In each case, device management process 200 begins at step 210 and advances to step 215.

In step 215, a local processor sends a message to a remote processor and also authorizes a proxy machine to route a message from the remote processor to the local processor. The message from the local processor is intended to initiate communication between the local processor and the remote processor, and it typically includes configuration information regarding the local processor and the devices to be managed.

In step 220, the local processor receives the message from the remote processor. The message from the remote processor indicates one or more commands to be executed by the local processor.

In step 225, the local processor executes the commands that were indicated in the message from the remote processor in step 220. For example, the commands may require reading a particular device's configuration status, or executing an affirmative action such as reinitializing the device.

In step 230, the local processor further evaluates the message from the remote processor to determine whether the remote processor requires the local processor to send another message to the remote processor. For example, a previous message from the remote processor may have initiated a calibration of a device, and the remote processor now requires some feedback to determine whether the calibration was successful.

The determination made during step 230 also allows the remote processor to control whether the exchange of messages with the local processor will be continued. Recall that the proxy machine routes messages from the remote processor to the local processor only when authorized to do so, and that the authorization is required on a per message basis. Accordingly, every message sent from the remote processor to the local processor must be preceded by an authorization from the local processor to the proxy machine. If the remote processor wishes to maintain communication with the local processor, then in each message to the local processor, the remote processor must direct the local processor to send another message to the remote processor.

If the message from the remote processor indicates that the local processor must send another message, then the process advances to step 235, otherwise the process advances to step 250.

In step 235, the local processor sends a next message to the remote processor and also authorizes the proxy machine to route a next message from the remote processor to the local processor.

In step 240, the local processor receives the next message from the remote processor. This message from the remote processor indicates one or more commands to be executed by the local processor.

In step 245, the local processor executes the commands that were indicated in the message from the remote processor in step 240. The process then loops back to step 230.

In step 250, the process terminates.

It should be understood that the foregoing description is only illustrative of the invention. Various alternatives and modifications can be devised by those skilled in the art without departing from the invention. For example, the devices being managed can be any computer peripheral, another computer, or the local processor itself. Also, in the case of a system that does not include a firewall or proxy machine, the process can be applied by merely eliminating the step of authorizing the proxy machine to route a message to the local processor. Further, while the procedures required to execute the invention hereof are indicated as already loaded into the memory of the local computer, they may be configured on a storage media, such as data memory 115 in FIG. 2 or data memory 115*a* in FIG. 3, for subsequent loading into the local computer. Accordingly, the present invention is intended to embrace all such alternatives, modifications and variances that fall within the scope of the appended claims.

What is claimed is:

1. A method for enabling a remote processor to control a device coupled to a local processor, said remote processor coupled to said local processor across a computer network, and a proxy machine operatively interposed between said local processor and said computer network to route, messages from said local processor to said computer network and, only when authorized, to route messages from said computer network to said local processor, said local processor performing a method that enables said remote processor to control operation of said device, not withstanding a presence of said proxy machine, said method comprising the steps of:

(a) sending a message to said remote processor and authorizing said proxy machine to route a message from said remote processor to said local processor;

(b) receiving said message from said remote processor, routed by said proxy machine, indicating a command to be executed by said local processor;

(c) executing said command; and before step (a), the step of receiving a message from an electronic mail processor, directing said local processor to initiate communication with said remote processor.

2. The method recited in claim 1, wherein said message from said remote processor directs said local processor to send a next message to said remote processor, and said local processor further performs the steps of:

(d) s ending said next mess age to said remote processor and authorizing said proxy machine to route a next message from said remote processor to said local processor;

(e) receiving said next message from said remote processor indicating a next command; and (f) executing said next command.

3. The method recited in claim 2, wherein said next message from said remote processor directs said local processor to send another message to said remote processor, said method further comprising the step of repeating steps (d), (e) and (f).

4. The method recited in claim 1, wherein a request is a message soliciting information, and a response is a message providing information, said message from said local processor to said remote processor is a request, and thereafter, messages from said remote processor to said local processor are requests, an d messages from said local processor to said remote processor are responses.

5. The method recited in claim 1, wherein said message from said local processor to said remote processor includes information regarding an operating parameter of said device, and said command directs said local processor to configure said operating parameter of said device.

6. The method recited in claim 1, wherein said local processor is included in said device.

7. A memory media that stores a program for enabling a remote processor to control a device coupled to a local processor, said remote processor coupled to said local processor across a computer network, and a proxy machine operatively interposed between said local processor and said computer network to route messages from said local processor to said computer network and, only when authorized, to route messages from said computer network to said local processor, said remote processor being enabled to control operation of said device, notwithstanding a presence of said proxy machine, said memory media comprising:

(a) means for controlling said local processor to send a message identifying said device to said remote processor and to authorize said proxy machine to route a message from said remote processor to said local processor;

(b) means for controlling said local processor to receive a message from said remote processor, routed by said proxy machine, indicating a command to be executed by said local processor with respect to said identified device; and (c) means for controlling said local processor to execute said command with respect to said identified device.

8. The memory media recited in claim 7, wherein said message from said remote processor directs said local processor to send a next message to said remote processor, said memory media further comprising:

(d) means for controlling said local processor to send said next message to said remote processor and to authorize said proxy machine to route a next message from said remote processor to said local processor;

(e) means for controlling said local processor to receive said next message from said remote processor indicating a next command; and (f) means for controlling said local processor to execute said next command.

9. The memory media recited in claim 8, wherein said next message from said remote processor directs said local processor to send another message to said remote processor, said memory media further comprising means for controlling said local processor to cause said means (d), (e) and (f) to repeat their respective actions.

10. The memory media recited in claim 7, wherein a request is a message soliciting information, and a response is a message providing information, said message from said local processor to said remote processor is a request, and thereafter, messages from said remote processor to said local processor are requests, and messages from said local processor to said remote processor are responses.

11. The memory media recited in claim 7, wherein said message from said local processor to said remote processor includes information regarding an operating parameter of said device, and said command directs said local processor to configure said operating parameter of said device.

12. The memory media recited in claim 7, further comprising means for controlling said local processor to receive a message from an operator directing said local processor to initiate communication with said remote processor.

13. The memory media recited in claim 7, further comprising means for controlling said local processor to receive a message from an electronic mail processor directing said local processor to initiate communication with said remote processor.

14. The memory media recited in claim 7, further comprising means for controlling said local processor to receive a message from said device directing said local processor to initiate communication with said remote processor.

15. The memory media recited in claim 7, wherein said local processor is included in said device.

16. The method recited in claim 1, wherein said message from said local processor to said remote processor identifies said device, and said command to be executed by said local processor is to be executed with respect to said device.

17. A memory media that stores a program for enabling a remote processor to control a device coupled to a local processor, said remote processor coupled to said local processor across a computer network, and a proxy machine operatively interposed between said local processor and said computer network to route messages from said local processor to said computer network and, only when authorized, to route messages from said computer network to said local processor, said remote processor being enabled to control operation of said device, notwithstanding a presence of said proxy machine, said memory media comprising:

(a) means for controlling said local processor to send a message to said remote processor and to authorize said proxy machine to route a message from said remote processor to said local processor;

(b) means for controlling said local processor to receive a message from said remote processor, routed by said proxy machine, indicating a command to be executed by said local processor; and (c) means for controlling said local processor to execute said command; wherein said message from said local processor to said remote processor includes information regarding an operating parameter of said device, and said command directs said local processor to configure said operating parameter of said device.

18. The method recited in claim 1, wherein said device comprises a peripheral device, and said executing comprises executing said command with respect to said peripheral device.

19. The memory media recited in claim 7, wherein said means for controlling said local processor to execute comprises means for controlling said processor to execute said command with respect to said device comprising a peripheral device.

20. The memory media recited in claim 17, wherein said command directs said local processor to configure said operating parameter of said device comprising a peripheral device.

* * * * *